United States Patent [19]

Dooley

[11] Patent Number: 4,491,246
[45] Date of Patent: Jan. 1, 1985

[54] SEED SUPPLY SYSTEM FOR MULTIPLE ROW SOWER

[75] Inventor: James H. Dooley, Federal Way, Wash.

[73] Assignee: Weyerhaeuser Company, Tacoma, Wash.

[21] Appl. No.: 476,752

[22] Filed: Mar. 18, 1983

[51] Int. Cl.³ ............................................... A01C 7/04
[52] U.S. Cl. ................................... 222/129; 222/608; 222/482; 222/564; 111/1
[58] Field of Search ............... 222/129, 426, 430, 478, 222/526, 527, 431, 460, 462, 488, 485, 547, 564, 481, 459, 608–610, 623–625; 111/1; 141/288, 302; 239/553, 689

[56] References Cited

U.S. PATENT DOCUMENTS

| | | | |
|---|---|---|---|
| 479,151 | 7/1892 | Menze | 222/430 |
| 1,016,766 | 2/1912 | Packham | 222/459 |
| 1,618,118 | 2/1927 | Vartabedian | 222/485 |
| 2,942,761 | 6/1960 | Jungmayr | 222/168 |
| 3,477,212 | 11/1969 | Coffman | 222/625 |
| 3,990,606 | 11/1976 | Gugenham | 221/211 |
| 4,145,980 | 3/1979 | Boots | 111/1 |
| 4,241,849 | 12/1980 | Harrer | 221/266 |
| 4,286,530 | 9/1981 | Conley | 111/1 |
| 4,306,509 | 12/1981 | Hassan et al. | 111/34 |

FOREIGN PATENT DOCUMENTS 3003919 4/1980 Fed. Rep. of Germany .

OTHER PUBLICATIONS

Pneumasem II brochur, Nodet Gougis, Montereau, France.

Primary Examiner—Joseph J. Rolla
Assistant Examiner—Andrew Jones

[57] ABSTRACT

A seed supply system for a multiple row sower comprises a main seed hopper connected to a plurality of sower units by seed supply ducts. The main hopper has a seed distributor that divides a supply of seed uniformly between the seed supply ducts as seed flows out by gravity. The hoppers of each sower unit are provided with partitions that can be moved up or down to adjust the seed volume contained within the hopper. The partitions can then be adjusted so that the volume of seed contained within a sower unit hopper and its associated seed duct is equal to the volumes of each other sower unit hopper and the associated seed duct. By equalizing the volumes in this way all hoppers will run out of seed essentially simultaneously.

8 Claims, 5 Drawing Figures

SEED SUPPLY SYSTEM FOR MULTIPLE ROW SOWER

BACKGROUND OF THE INVENTION

The present invention comprises an improved seed supply system for a multiple row seed sower. This system is advantageous in that a uniform volume of seed is always made available to each sower unit, regardless of its position and distance from the seed source. In this way, if the supply of seed becomes exhausted during sowing operations, each sower unit will run out of seed essentially simultaneously.

Seed sowing devices having multiple sower units which are fed from a central seed hopper or reservoir are fairly well known for various agricultural applications. One example is shown in U.S. Pat. No. 4,145,980 to Boots. Here, a long drum is perforated around its circumference with a number of parallel rows of small holes. Pressure inside the drum is reduced so that as the drum rotates by a trough filled with seeds, the seeds are picked up by the holes. They are then transported to a planting location at which point the vacuum is temporarily broken to release the seed. A similar system is shown in U.S. Pat. No. 4,306,509 to Hassan, et al. and in West German application DE 30 03 919. U.S. Pat. Nos. 3,990,606 to Gugenhan and 4,241,849 to Harrer show individual sower units which can be used in ganged fashion. Each of these units has a separate seed hopper, however. One system known to applicant has sower units very similar to those shown in the previous two patents. These also have individual seed hoppers for each sower unit. However, the sower unit hoppers are apparently supplied from a single main seed hopper through seed supply ducts. This device is sold commercially as the Pneumasem II and is available from its manufacturer, Nodget Gougis, Montreau, France. The mechanism by which seed is transferred from the main hopper to the sower unit hoppers is not known to the present inventors. It does not appear to be by gravity since illustrations show loops in the seed supply ducts.

One problem with the use of a sower having individual sower unit hoppers is that it is impractical in the field to measure identical quantities of seed into each hopper. Situations arise where seed of a given species or family within a species is sown in relatively small lot numbers. An example might be the production of tree seedlings for reforestation. Land value in these nurseries is extremely high and it is essential that little or no growing space is wasted. Such waste occurs when planting a multiple row bed if the hoppers do not run out of seed essentially simultaneously. One source of difficulty with a device using a central seed hopper having seed tubes leading to the individual sower unit hoppers is the unequal volumes of seed contained within each line. Generally speaking, the outside sower unit hoppers will have more seed in inventory than will the inside sower unit hoppers. This is because of the greater volume of seed contained within the relatively longer ducts necessary to reach the outside hoppers. If the seed supply in the main hopper runs out, seed will continue to be sowed in the outer rows for a considerable distance after the point at which it has been exhausted in the inner rows. The present invention is a seed supply system that overcomes this deficiency. It maintains essentially equal volumes of seed in the supply provided for each sower unit. In this way, when the seed supply becomes exhausted, each row will end at substantially the same location.

SUMMARY OF THE INVENTION

The present invention comprises a seed supply system for a multiple row seed sower of the type having a main seed hopper, a plurality of seed hoppers for the individual sower units, and seed supply ducts connecting each sower unit hopper with the main hopper. It comprises a distribution means in the main hopper adapted to insure a constant and uniform flow of seed by gravity into the supply ducts. The word "uniform" in the present context means essentially equal quantities of seed entering each duct per unit of time. Each of the sower unit seed hoppers has a transverse partition means which is adjustable to control the seed volume contained within the hopper. This partition is adjusted so that the combined volume of each individual sower unit hopper and its associated supply duct can be adjusted to equalize this volume with the combined volumes of all other sower units and their associated supply ducts. This ensures that if the seed supply runs out in the main seed hopper during sowing, all of the units will run out of seed essentially simultaneously when the seed is exhausted from their respective supply ducts and sower head hoppers.

A preferred seed distributor means is located at the bottom of the main hopper and comprises an outer inverted truncated cone portion and a coaxial upright inner cone portion whose base intersects the walls of the outer cone portion along a circular path. While the term "inverted" is relative, in the present context it refers to a cone positioned so that its base is above its apex. A plurality of seed flow apertures are spaced along the circle defined by the intersection of the cone portions. These apertures are in communication with the supply ducts leading to the sower unit hoppers. In the most preferred construction, the apertures are uniformly spaced at equiangular positions around the circle defined by the intersection of the two cones. Preferably, the seed distributor further includes radially oriented wedge-shaped members which are located between the two cone portions and are equidistant between the seed apertures. These wedges are sized so that all surfaces in the distributor means slope downward toward the apertures thereby eliminating dead zones where seeds can be trapped.

It is most desirable to include a shutter means or other system for controlling seed flow from the main hopper into the supply ducts. This is necessary so that if one of the sower unit hoppers must be removed for servicing or for some other reason, there will not be a continuous flow of seed from the main hopper. The shutter is important for other reasons. If one seed lot has been run out of the main hopper, the shutter can be closed and a new seed lot added. This will not be sown until the first batch of seed has been entirely planted. The operator can identify this location in the nursery bed, open the shutter, and then proceed with sowing the new seed lot. A preferred shutter means comprises a plate adapted to fit tigthly against the lower surface of the seed distributor where it is positioned between the distributor and the seed supply ducts. In the preferred construction, this is a flat plate situated normal to and having limited rotation about the axis of the cones. The plate is provided with apertures in locations that correspond to the apertures in the seed distributor means. The plate may be rotated sufficiently so that when it is in a first position, it permits seeds to pass from the main seed hopper into the ducts. When rotated to a second position, it closes the apertures in the distributor means and prevents the passage of seeds.

The partition means in the sower unit hoppers are preferably slidable up or down to conveniently adjust the volume of these hoppers. A retaining means can be provided to lock the partitions into position since normally only a one-time adjustment will be required.

DETAILED DESCRIPTION OF THE PREFERRED EMBODIMENT

For the sake of illustration, the seed hopper will be shown adapted for use with eight individual sower units. These can be presumed to be operating side by side on a tool bar and could be of the types shown in either the aforementioned Gugenhan or Tye patents.

The system consists of a main seed hopper generally indicated at 10 and a series of sower unit seed hoppers 32, 34, 36, 38, only four of which are numbered. The remaining sower unit hoppers would be in mirror relationship to the four that are numbered. The sower unit hoppers are connected to the main hopper by a series of seed ducts or distribution tubes 22, 24, 26, and 28.

Figure 3:
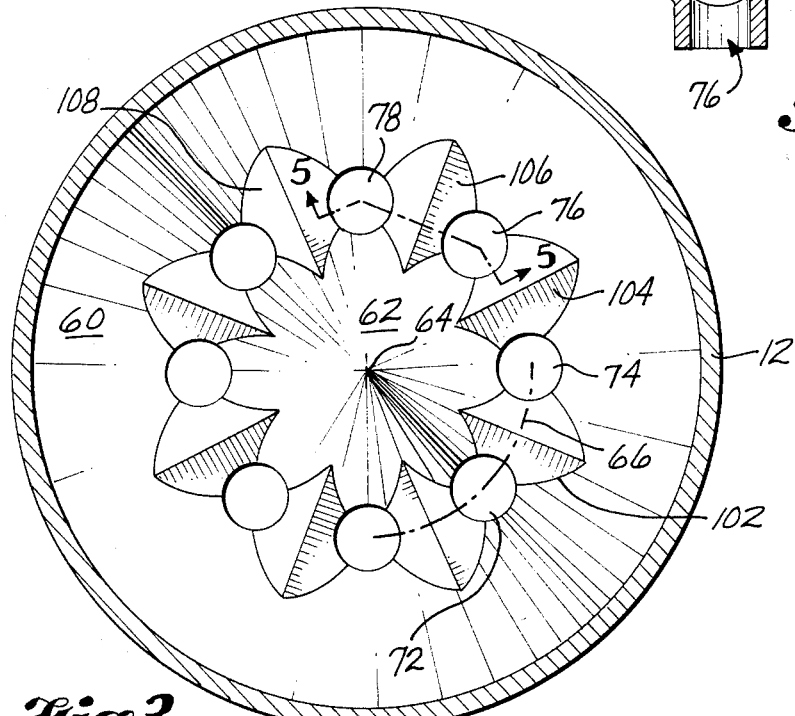
FIG. 3 is a view looking into the hopper along section 3—3 of FIG. 1.

The main seed hopper consists of a drum 12, which provides a volume of the storage of seeds, and a seed distributor, generally indicated at 14. The seed distributor serves to uniformly divide seed from drum 12 into the series of seed ducts that convey seed to the individual sower units. The drum may conveniently be retained to the seed distributor by means of a telescopic fit, the drum being seated against a retaining lip 15 (FIG. 3). Screen 16 may optionally be used across the top of the drum to retain and/or break up any clumps of seeds that may have been formed because of seed coatings or other treatments. Cover 18 is conveniently used to keep any foreign matter out of the system that could ultimately serve to clog the vacuum orifices of the sower units.

Figure 1:
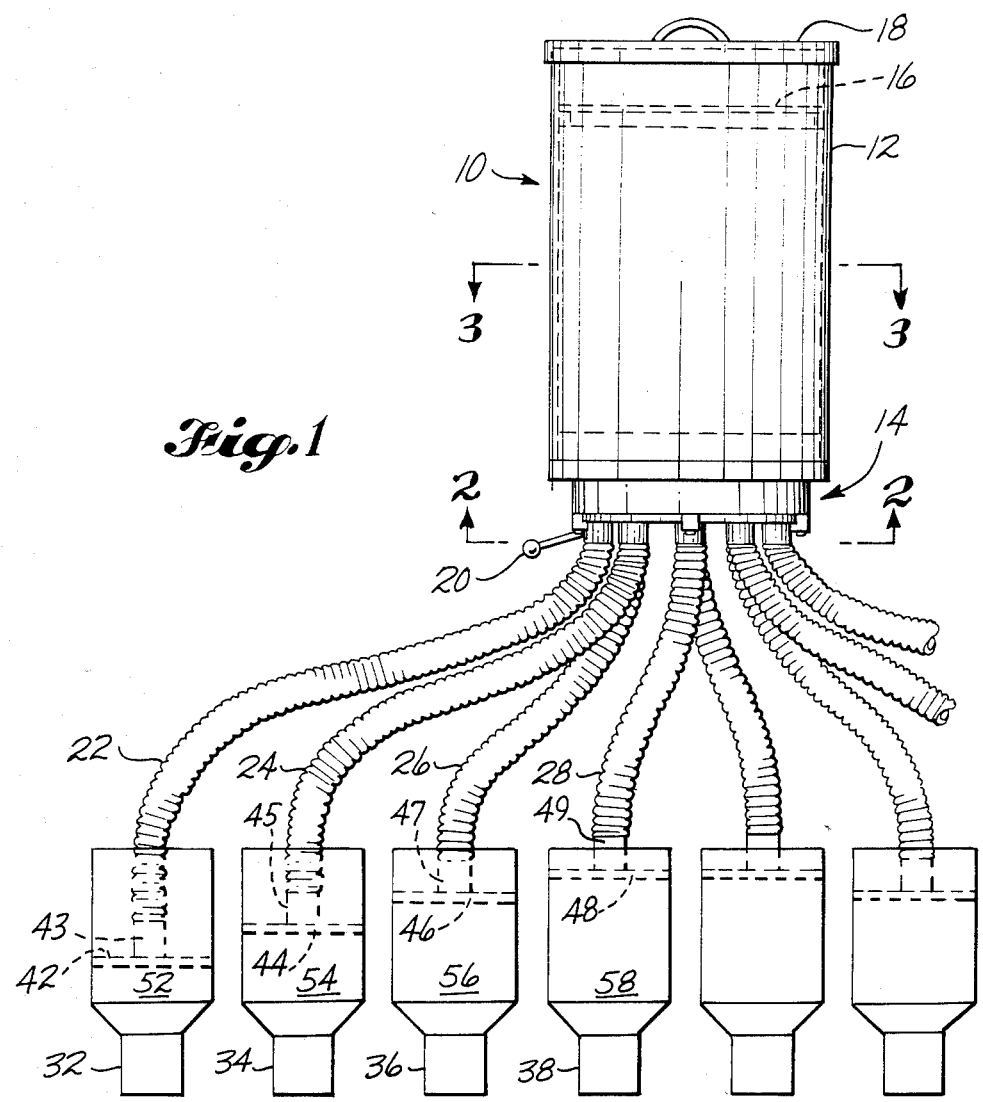
FIG. 1 is a generalized elevation view of the seed hopper adapted to supply seed to eight individual sower units.

Flow of seed from the main hopper is controlled by a shutter or valve of which only handle 20 is visible in FIG. 1.

An integral and critical part of the present invention is the use of sliding partitions 42, 44, 46, 48 which are located transversely in each individual sower unit seed hopper. These partitions have nipples 43, 45, 47, 49 by which they are connected to their respective seed ducts. The transverse partitions are vertically slidable so as to control the maximum seed volume that will be contained within each individual sower unit seed hopper. This is done so that the volume of seed contained within the sower unit hopper and its associated seed duct or distribution tube will be equal to the volume of seed contained within every other sower unit hopper and its associated distribution tube. Normally the ducts to the outboard sower units; e.g., distribution tubes 22, 24, will be longer than those for the interior sower units. For this reason, a larger volume of seed will be retained within the outer distribution tubes. To compensate for this situation the transverse partitions in the outboard sower unit hoppers can be slid downward so as to reduce the volume of the hopper. By maintaining the seed volume in each individual sower unit system equal, if the main hopper runs out of seed during sowing operations, each unit will run out of seed essentially simultaneously. Thus, in the present example, the seed volumes 52, 54, 56 and 58 are adjusted to compensate for the length of the distribution tube supplying each of these hoppers.

The importance of each sower unit running out of seed essentially simultaneously can be shown by the following example drawn from nursery operations for producing pine seedlings for reforestation. Loblolly pine (*pinus tadea*) seeds, average about 38–44,000 per kg and have a bulk density of approximately 720 Kg/m$^3$ (45 lb/ft$^3$). Typical diameter of the seed ducts will be approximately 38 mm. If the outer tubes 22 are only 200 mm longer than the interior tubes 28, they will contain approximately 6,800 more seeds. If the main hopper should run out of seed during sowing operations, and if provisions were not made to equalize the seed volume in each individual sower unit system, the inner rows would run out of seed almost 140 meters before the seed in the outer sowers would be exhausted, assuming a 2 cm spacing. This undesirable situation cannot be tolerated in a nursery where both seed costs and land values are extremely high.

Figure 2:
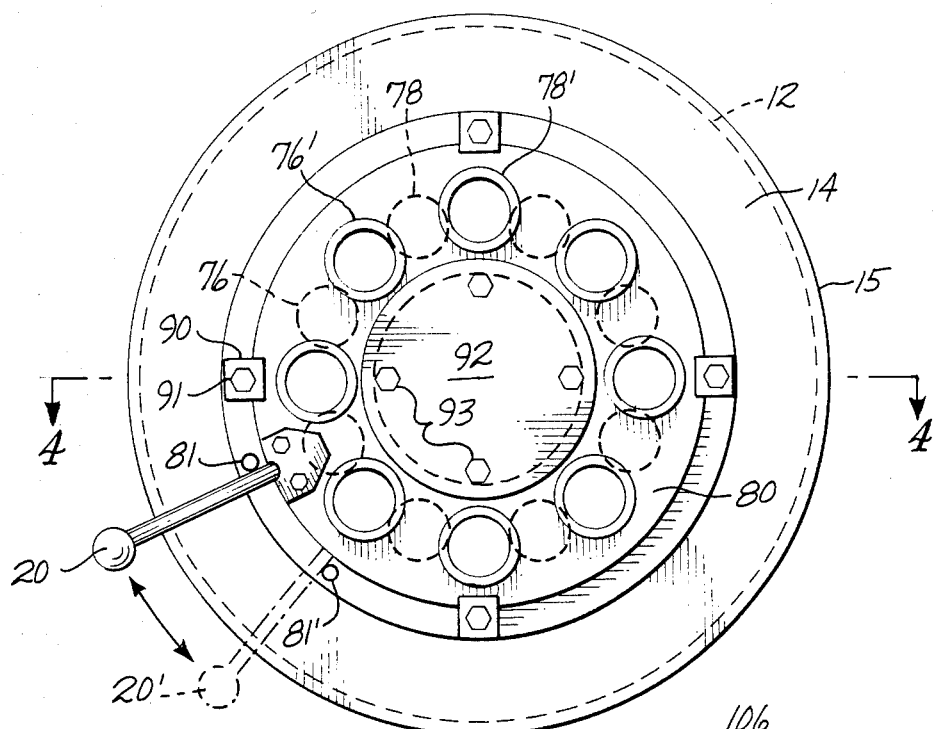
FIG. 2 is a plan view of the bottom of the main seed hopper taken along section 2—2 of FIG. 1.
Figure 5:
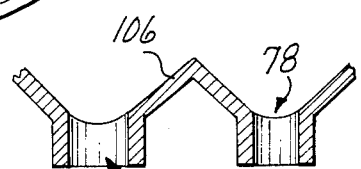
FIG. 5 is a fragmentary vertical section taken along line 5—5 of FIG. 3.

Reference is now made to FIGS. 2–5 where the construction of the seed distributor in the main seed hopper will be explained. This consists of an outer inverted truncated cone 60 with an inner upright cone 62, with both cones lying upon the same vertical axis which passes through apex 64 of the inner cone. The cones intersect to define a circle 66 which is concentric about apex 64. A series of apertures 72, 74, 76, and 78, only four of which are numbered, are formed to permit passage of seed out of the V-shaped annular trough defined by the cones. These are preferably placed at a regular equiangular spacing around circle 66. A valve or shutter plate 80 underlies seed distributor 14. This is held in sliding contact with the seed distributor by retainer lugs 90, or a retainer ring, and retainer plate 92. These are held in place respectively by a series of bolts 91 and 93. The shutter plate bears a handle 20 by which it may given limited rotation between stop lugs 81, 81'. Shutter plate 80 possesses a series of nipples 82, 84, 86, 88 which correspond with apertures 72, 74, 76, 78 in the distributor means. In FIG. 2, the shutter is shown in position to close the orifices in the seed distribution means in order to stop seed flow. By rotating handle 20 one-eighth turn to position 20' the orifices are opened so that seed can flow into the distribution tubes.

Figure 4:
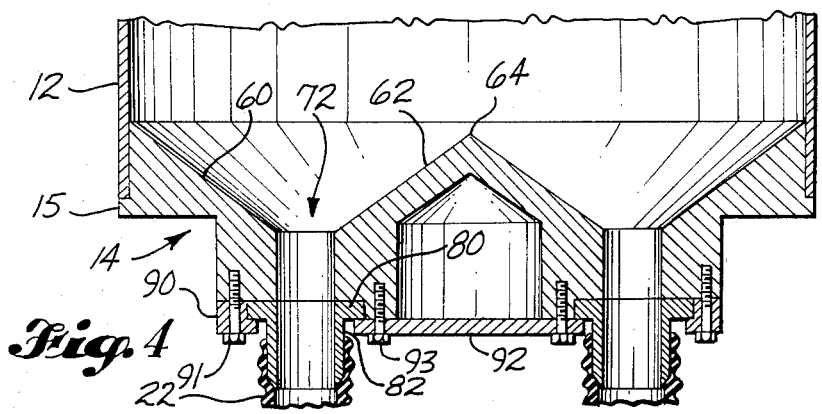
FIG. 4 is a vertical section of the seed distributor taken along line 4—4 of FIG. 2.

With the seed distributor constructed as shown in FIGS. 2 and 4, small dead spots which can retain seed are formed in the portion of the trough lying between the apertures. This may form no problem when sowing some crops, but it can be troublesome with others. To overcome this difficulty, a series of wedge-shaped members 102, 104, 106, 108 (FIG. 3) can be placed each of the apertures. By using these wedges, all of the surfaces in the seed distributor will slope into the apertures so that it is virtually impossible for any seed to hang up in the main hopper when the seed supply becomes exhausted. This feature is very advantageous in that it saves considerable cleanup time in the field when changing seed lots or plant species.

Since the seed distributor would otherwise involve relatively complex machining and assembly of a larg number of parts, it is preferably made as a metal casting or plastic molding.

Partitions 42, 44, 46, 48 may be provided with springs, set screws, or other well-known means to retain them in position in their respective lower seed hoppers. Once these are adjusted, there should be little need for readjustment unless the sower units are put on spacings which require different duct lengths.

Having now described the best known mode of the invention, it will be apparent to those skilled in the art that changes could be made without departing from the spirit of the invention. The invention is to be considered limited only as defined in the following claims.

What is claimed is:

1. In a seed supply system for a multiple row seed sower of the type having a main seed hopper, a plurality of individual sower unit seed hoppers, and seed supply ducts connecting each sower unit hopper with the main hopper, the improvement which comprises:
   a. a seed distributor means in the main hopper adapted to provide a uniform flow of seed by gravity into the supply ducts;
   b. transverse partition means in each sower unit hopper, said partition means being adjustable to control the seed volume contained in each sower unit hopper, and
   c. each transverse partition means being adjustably disposed within its associated sower unit hopper such that the combined volume of each sower unit hopper below the trasverse partition means and the volume defined within the associated seed supply duct is substantially equal for each sower unit hopper and its associated seed supply duct, whereby:
   if the main hopper seed supply runs out during sowing, all units will run out of seed essentially simultaneously.

2. The seed supply system of claim 1 in which the seed distributor means is located at the bottom of the main hopper and comprises an outer inverted truncated cone portion, a coaxial upright inner cone portion whose base intersects the walls of the outer cone portion, and a plurality of seed flow apertures spaced along the circle defined by the intersection of the cone portions, said apertures being in communication with the supply ducts.

3. The seed supply system of claim 2 in which the seed distributor means further includes a shutter means for controlling seed flow by opening or closing the entrance to the ducts.

4. The seed supply system of claim 3 in which the shutter means comprises a plate situated normal to and having limited rotation about the axis of the cones, said plate being located between the flow apertures in the distributor means and the seed supply ducts and having apertures in location corresponding to the apertures in the distributor means, so that when the plate is in a first position, it allows seeds to pass from the main seed hopper to the ducts, and when rotated to a second position, it closes the apertures in the distributor means and prevents the passage of seeds.

5. The seed supply system of claim 2 in which the apertures are uniformly spaced at equiangular positions around the circle of intersection of the two cones.

6. The seed supply system of claim 5 which further includes radially oriented wedge-shaped members located between the two cone portions and equidistant between the seed apertures so that all surfaces in the distributor means slope downward toward the apertures thereby eliminating zones where seeds can be trapped.

7. The seed supply system of claim 1 in which the supply ducts enter the sower unit hopper through the transverse partition means.

8. The seed supply system of claim 7 in which the transverse partition means are slideable up or down in the sower unit hoppers to adjust the volume thereof.

* * * * *

UNITED STATES PATENT AND TRADEMARK OFFICE
CERTIFICATE OF CORRECTION

PATENT NO. : 4,491,246
DATED : Jan. 1, 1985
INVENTOR(S) : James H. Dooley

It is certified that error appears in the above—identified patent and that said Letters Patent is hereby corrected as shown below:

In column 4, line 63, "placed each" should read -- placed between each --;

in column 5, line 4, "larg" should read -- large --;

in column 5, line 15, "that changes" should read -- that many changes --;

in column 5, line 34, "trasverse" should read -- transverse --.

Signed and Sealed this

Seventh Day of May 1985

[SEAL]

Attest:

DONALD J. QUIGG

*Attesting Officer*      *Acting Commissioner of Patents and Trademarks*